US009973339B1

(12) United States Patent
Lyadvinsky (10) Patent No.: US 9,973,339 B1
(45) Date of Patent: May 15, 2018

(54) ANONYMOUS CLOUD DATA STORAGE AND ANONYMIZING NON-ANONYMOUS STORAGE

(71) Applicant: Acronis International GmbH, Schaffhausen (CH)

(72) Inventor: Maxim V. Lyadvinsky, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 69 days.

(21) Appl. No.: 15/047,219

(22) Filed: Feb. 18, 2016

(51) Int. Cl.
*H04L 9/08* (2006.01)
*H04L 29/06* (2006.01)
*G06F 17/30* (2006.01)

(52) U.S. Cl.
CPC ...... *H04L 9/0861* (2013.01); *G06F 17/30091* (2013.01); *H04L 63/06* (2013.01)

(58) Field of Classification Search
None
See application file for complete search history.

(56) References Cited

U.S. PATENT DOCUMENTS

| 8,528,085 B1* | 9/2013 | Juels | G06F 17/30091 |
| | | | 726/22 |
| 2002/0162068 A1* | 10/2002 | Meggers | H03M 13/134 |
| | | | 714/755 |
| 2007/0226505 A1* | 9/2007 | Brickell | G06F 21/57 |
| | | | 713/176 |

* cited by examiner

*Primary Examiner* — Joseph P Hirl
*Assistant Examiner* — Hassan Saadoun
(74) *Attorney, Agent, or Firm* — Arent Fox LLP; Michael Fainberg (57) ABSTRACT

A process of writing to a non-anonymous cloud storage is provided. On a client side, a write request to block X is received. A block key for the block numbers X is calculates as a function, which uses an Anonymous Key and X as its arguments. A hash function value of the block key is calculated. The content and the hash value are transferred to a Virtual Cloud Service. Then, on the Virtual Cloud Service, public cloud accounts are selected based on part of the hash value. A file name is generated from the calculated hash value. The content of block X is stored to the file with the generated name within the selected cloud account. Thus, there is no data reflecting the ownership of the user files on the cloud storage that is revealed.

13 Claims, 6 Drawing Sheets

ANONYMOUS CLOUD DATA STORAGE AND ANONYMIZING NON-ANONYMOUS STORAGE

BACKGROUND OF THE INVENTION

Field of the Invention

This invention relates to a method and system for a secure cloud data storage, and more particularly, to a method for providing an anonymous cloud data storage.

Description of the Related Art

Modern cloud data storages are designed in such a way that, while it is not possible to access encrypted user data in the cloud, it is still possible to determine that a particular block of data belongs to a certain user. Since each user has his own account, it is easy to determine that all the data blocks stored within this account belong to this particular user. In other words, the cloud storages do not provide for any level of anonymity.

When an intruder wants to access some user data, it is easier to get user encrypted data blocks and then attempt to decrypt them offline. Anonymity of the cloud storage data is an additional level of privacy protection. However, existing cloud storage solutions do not provide for any user data anonymity.

Accordingly, it is desired to have an anonymous cloud storage, which protects information about ownership of the user data.

SUMMARY OF THE INVENTION

Accordingly, the present invention is related to a method and system for providing an anonymous cloud data storage that substantially obviates one or more of the disadvantages of the related art.

In one embodiment, a method for writing to anonymous cloud or server-side storage data storage is provided. A write request to block X is received. Contents of the block X is encrypted. A block key for the block number X is calculated as a function, which uses an Anonymous Key and X as its arguments. A hash function value of the block key is calculated. A file name is generated from the hash function value. Then, the block X content is stored in the file with the generated name.

In another embodiment, a process of writing to a non-anonymous cloud or server-side storage is provided. On a client side, a write request to block X is received. Content of the block X is encrypted. A block key for the block number X is calculated as a function, which uses an Anonymous Key and X as its arguments. A hash function value of the block key is calculated. The encrypted content and the hash value are transferred to a Virtual Cloud Service. Then, on the Virtual Cloud Service, public cloud accounts are selected based on part of the hash value. A file name is generated from the calculated hash value. The content of block X is stored to the file with the generated name within the selected cloud account. Thus, there is no data reflecting the ownership of the user files on the cloud storage that can be revealed.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In one aspect of the invention, a storage anonymization allows for removing data indicating data ownership from the storage side by moving this knowledge (i.e., data location) exclusively to the client, who accesses the storage. This way a potential intruder cannot decrypt user data blocks on the server, because he would not be able to determine the data blocks belonging to a targeted user. Similarly, a government agency cannot order (or subpoena) the service provider to disclose data belonging to a particular user if the user data is stored on the anonymous data storage.

According to an exemplary embodiment, anonymous data storage can be created from scratch. However, existing non-anonymous storages (such as, for example Amazon S3) can be converted into anonymous storages.

Figure 1:
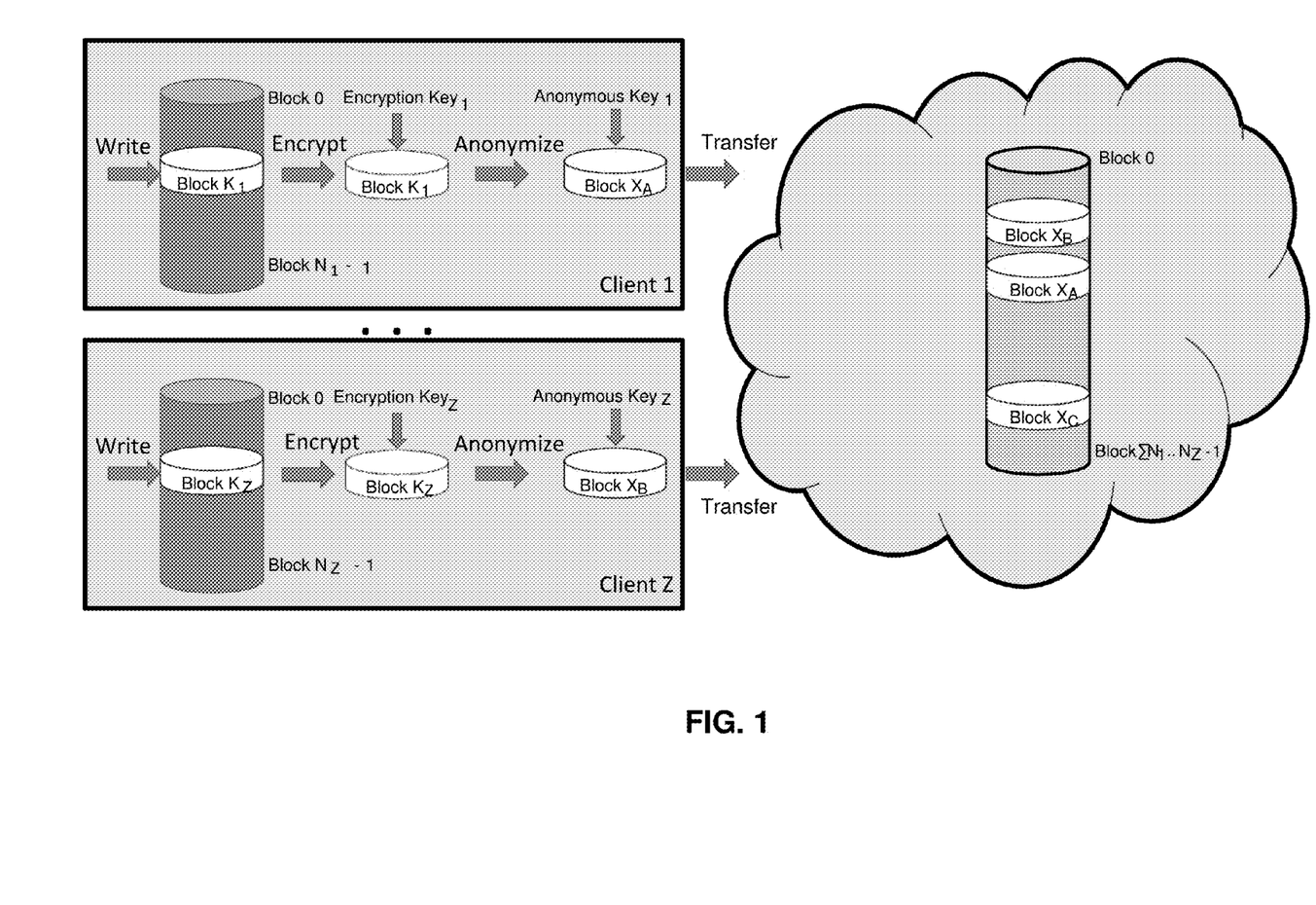
FIG. 1 illustrates a basic anonymous storage model, in accordance with the exemplary embodiment.

FIG. 1 illustrates a basic anonymous storage model, in accordance with the exemplary embodiment. The basic technology ensures revealing zero knowledge about clients, when both the content and the owner of a particular stored data block is unknown to the storage side. A block-level approach can be applied to anonymous storage. In this example, data for Z clients is stored. Each of the clients wants to have his personal storage with a fixed number of blocks. For example, client 1 needs a storage of $N_1$ blocks, Client 2 needs a storage of $N_2$ blocks, etc.

The total number of blocks all the clients want is a sum $S_{1...Z} = N_1 + N_2 + ... + N_Z$. Thus, a large storage with $S_{1...Z}$ blocks that can store data from Z clients is required on the cloud. Each client has some virtual storage that allows him to store the required number of blocks, and each block from the client's virtual storage is mapped to a physical storage in the cloud. In order to make sure the cloud side does not know whom a particular data block belongs to, the number of this block is combined with a special key and a special value (i.e., is Anonymous Block Key) is calculated on a client using a one-way hash function (i.e., a function, which cannot have a simple reverse calculation value).

According to the exemplary embodiment, a hash function is applied to the Anonymous Block Key for a block, which is unique for each user and is calculated as follows. For example, a user has his unique Anonymous Key represented by a 512 bit random number. Then, the Anonymous Block Key is calculated as a sum of Anonymous Key and block number. Then, the hash function is calculated for the Anonymous Block Key.

When, Client 1 receives a write request to a block $K_1$ in his virtual storage, the client encrypts this block with his Encryption $Key_1$. The next step is to calculate the physical address of this block in the cloud storage. The physical address is calculated using a hash function applied to the Anonymous $Key_1$. The Anonymous Key is a random private key that is generated for each client (by the user). The physical block address calculation can be executed using the following algorithm:

1. Client 1 has a private Anonymous $Key_1$ and receives a write to block $K_1$;
2. Anonymous Block $Key_{K1}$ is calculated as a simple sum of Anonymous $Key_1$ and $K_1$.
3. Hash function $H_{K1}$ for Anonymous Block $Key_{K1}$ is calculated;
4. Physical block number ($X_A$—see FIG. 1) is calculated as $H_{K1} * S_{1...Z}/\text{MaxH}$, where MaxH–a maximal possible calculated hash value;
5. The Client 1 writes to the block number $X_A$ on the cloud storage.

Since it is impossible to calculate the original location of the block $X_A$, and taking into account that the content of this block is encrypted, a model where the storage side is not aware of the ownership of each block of data is created.

While the basic model described above provides for an anonymous storage model, this model still has several drawbacks. For example:

1. The clients need to know the total number of blocks in the cloud storage (i.e., $S_{1...Z}$);
2. The smaller the total number of blocks ($S_{1...Z}$), the higher the probability of collisions when two clients can get similar physical block number for their blocks ($X_A$).

Figure 2:
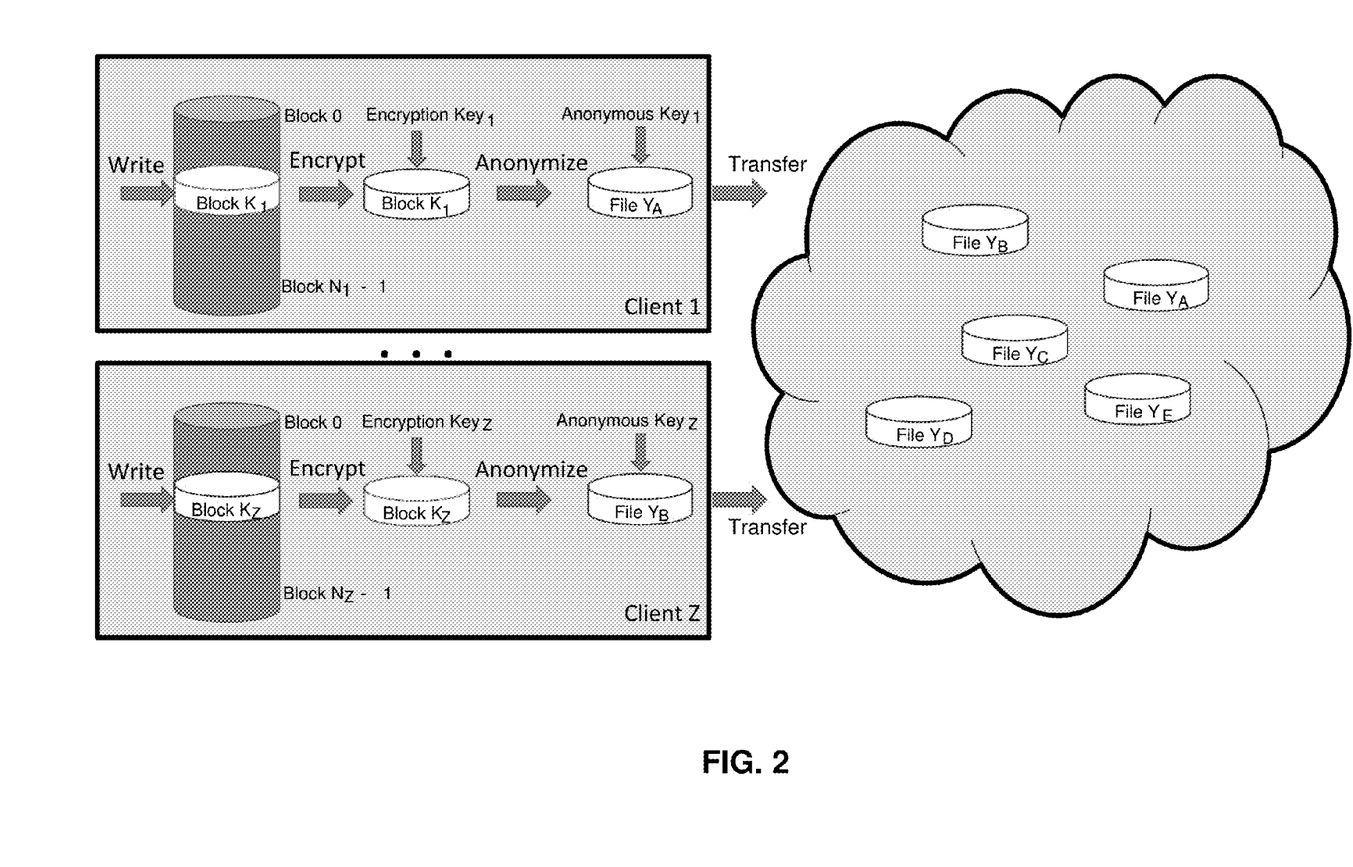
FIG. 2 illustrates an anonymous storage model extension, in accordance with the exemplary embodiment.

According to the exemplary embodiment, the following anonymous storage model extension depicted in FIG. 2 can overcome the above mentioned drawbacks. A file name in the cloud, where the block content will be stored, is calculated instead of block number. The file name calculation algorithm is as follows:

1. Client 1 has private Anonymous $Key_1$ and receives a write to block $K_1$;
2. Anonymous Block $Key_{K1}$ is calculated as a simple sum of Anonymous $Key_1$ and $K_1$:
Anonymous Block $Key_K1$=f(Anonymous Key1, K1). Any number of functions $f$ can be used, such as, for example f(a, b)→a+b, or f(a, b)→a+c*b, or f(a, b)→a+c*$b^2$, etc., as long as is serves to mix the random key with the block number;
3. Hash function $H_{K1}$ for Anonymous Block $Key_{K1}$ is calculated;
4. File name for a block ($Y_A$ in the FIG. 2) can be equal to text representation of the calculated hash function $H_{K1}$;
5. Client 1 writes to a file $Y_A$ on the cloud storage.

Figure 3:
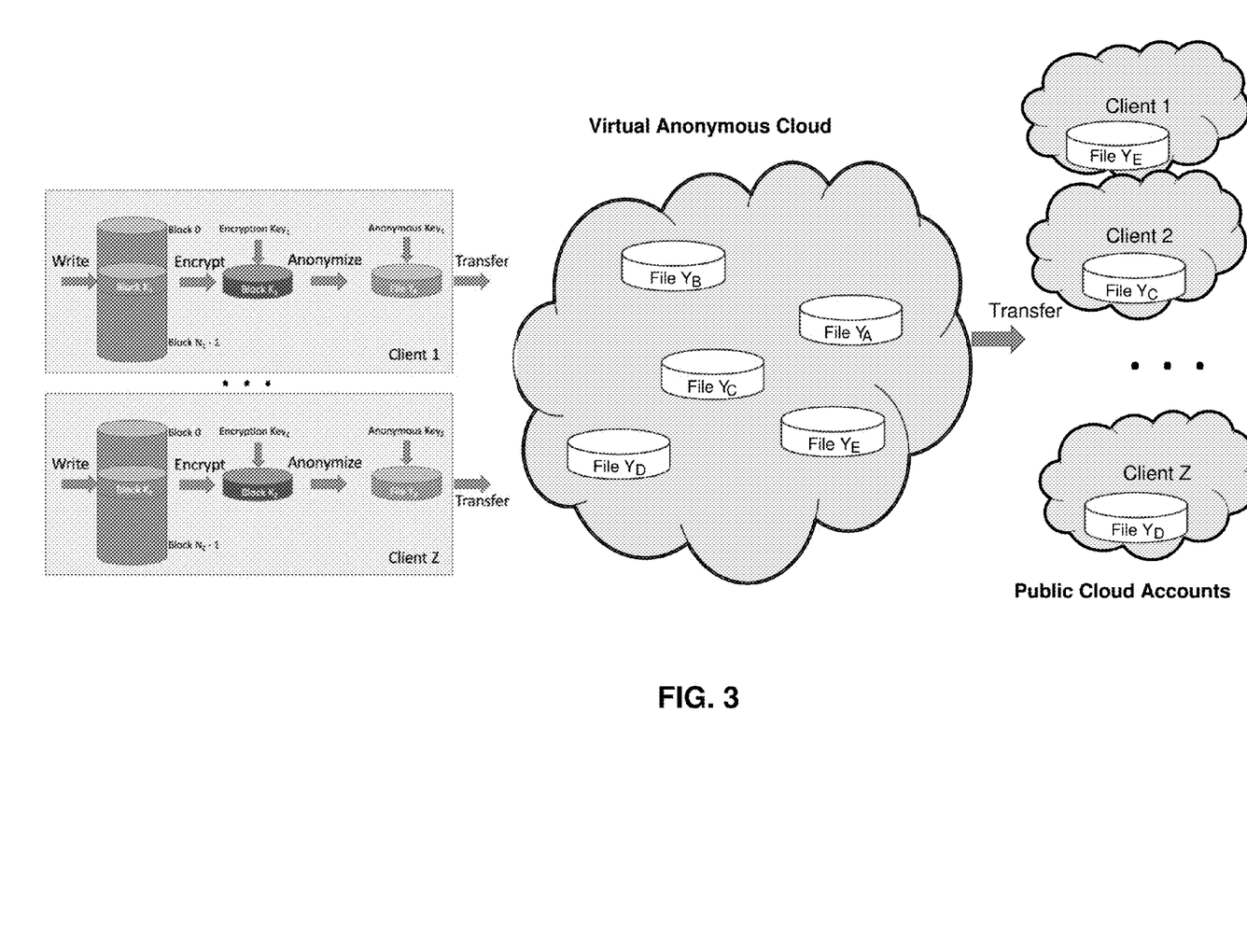
FIG. 3 illustrates anonymizing a Non-Anonymous Storage, in accordance with the exemplary embodiment.

FIG. 3 illustrates anonymizing a Non-Anonymous Storage, in accordance with the exemplary embodiment. As discussed above, modern cloud storages are tightly bound to users. The user data is always stored in the account of this user, so there is no anonymity, and it is always clear that a particular block of data belongs to a certain user. The anonymous storage concept outlined above can be applicable to cloud storages so that the users, who want to store their data anonymously, consolidate their accounts into a single anonymous storage space (i.e., Virtual Anonymous Cloud), which can be used equally by all participating users.

The Files $Y_A$-File $Y_E$ are stored on the server side. The server side has a special service the users can subscribe to in order to anonymize their cloud storage. For example, a user wants to store 1 GB of data in Amazon S3 anonymously. He goes to the anonymization service, stores his credentials for his Amazon S3 account, downloads the client and, then, starts working with Amazon via the Virtual Anonymous Cloud. If the user goes directly to his account in Amazon, he will see some random data that belongs to unknown users. At the same time, the data of this particular user will be distributed among participating accounts in the Virtual Anonymous Cloud service. Thus, the consolidated data storage is managed by a dedicated Virtual Anonymous Cloud service, which stores user credential information and helps to distribute data blocks evenly between public cloud accounts.

According to the exemplary embodiment, the Virtual Anonymous Cloud service is implemented as a third-party service in the cloud, which manages user credentials and assists in distributing data blocks in the cloud. The higher is the number of participating users, the higher level of anonymity can be achieved. Each user account contains encrypted blocks of data belonging to the unknown users. The data blocks read/write algorithm is similar to the Extended Anonymous Storage model with the following changes:

Client 1 has a public cloud account (e.g., Amazon S3), and has registered his credentials with Virtual Anonymous Cloud Service;

Client 1 has the private Anonymous $Key_1$ and receives a write to block $K_1$;

Anonymous Block $Key_{K1}$ is calculated as a simple sum of Anonymous $Key_1$ and $K_1$;

Hash function $H_{K1}$ for Anonymous Block $Key_{K1}$ is calculated;

A resulting value of the hash function together with the encrypted data block is transferred to the Virtual Anonymous Cloud Service;

The Virtual Anonymous Cloud Service uses the part of the hash function value to calculate the particular public user account to store a data block. According to the exemplary embodiment, the size of the hash function part depends on a number of registered public accounts. The higher is the number of accounts, the more bits from $H_{K1}$ are used to determine the public account. File name for a block ($Y_A$ in FIG. 3) can be equal to text representation of the calculated hash function $H_{K1}$;

The Virtual Anonymous Cloud Service writes to a file $Y_A$ in the selected public cloud account using the registered user credentials for accessing this public cloud account.

Figure 4:
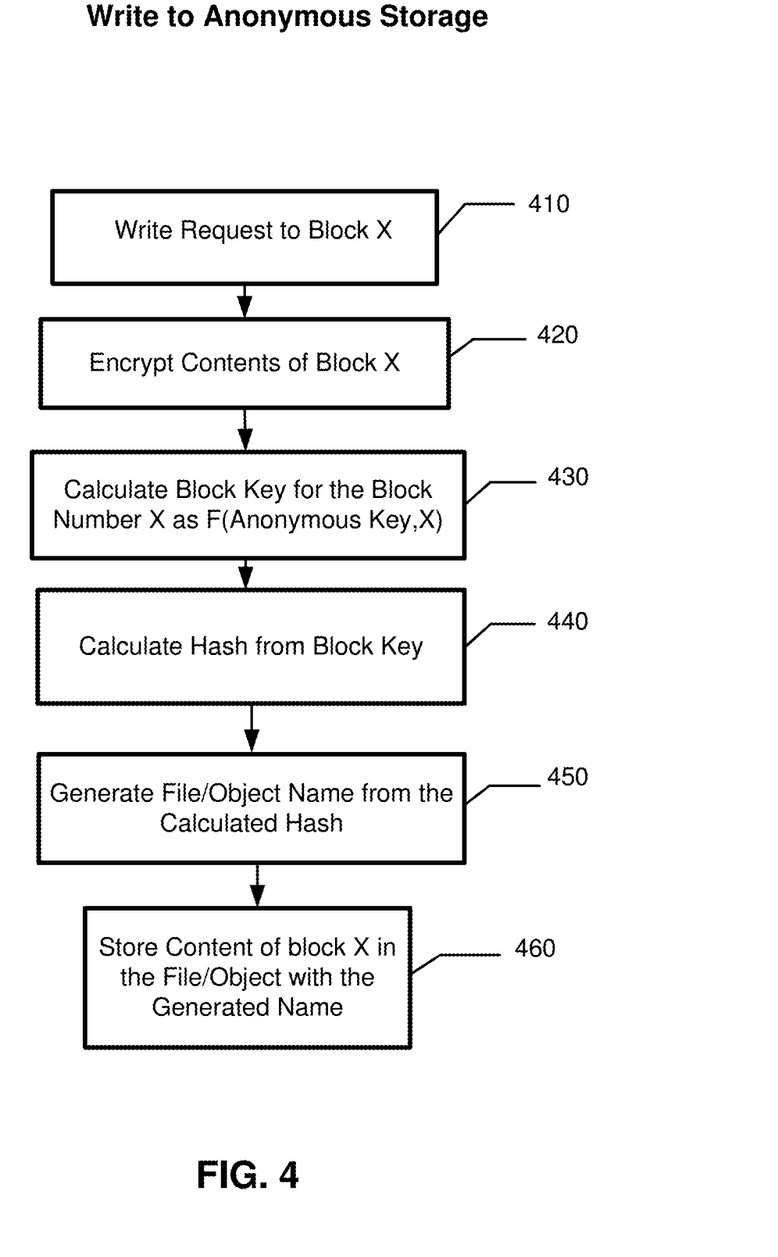
FIG. 4 illustrates a flowchart of a process of writing to an anonymous storage, in accordance with the exemplary embodiment.

FIG. 4 illustrates a flowchart of a process of writing to an anonymous storage, in accordance with the exemplary embodiment. In step 410, a write request to block X is received. Content of the block X is encrypted in step 420. A block key for the block number X is calculated as a function, which uses an Anonymous Key and X as its arguments in step 430. In step 440, a hash function value of the block key is calculated. In step 450, a file name is generated from the hash function value. Then, the block X content is stored in the file with the generated name in step 460.

Figure 5:
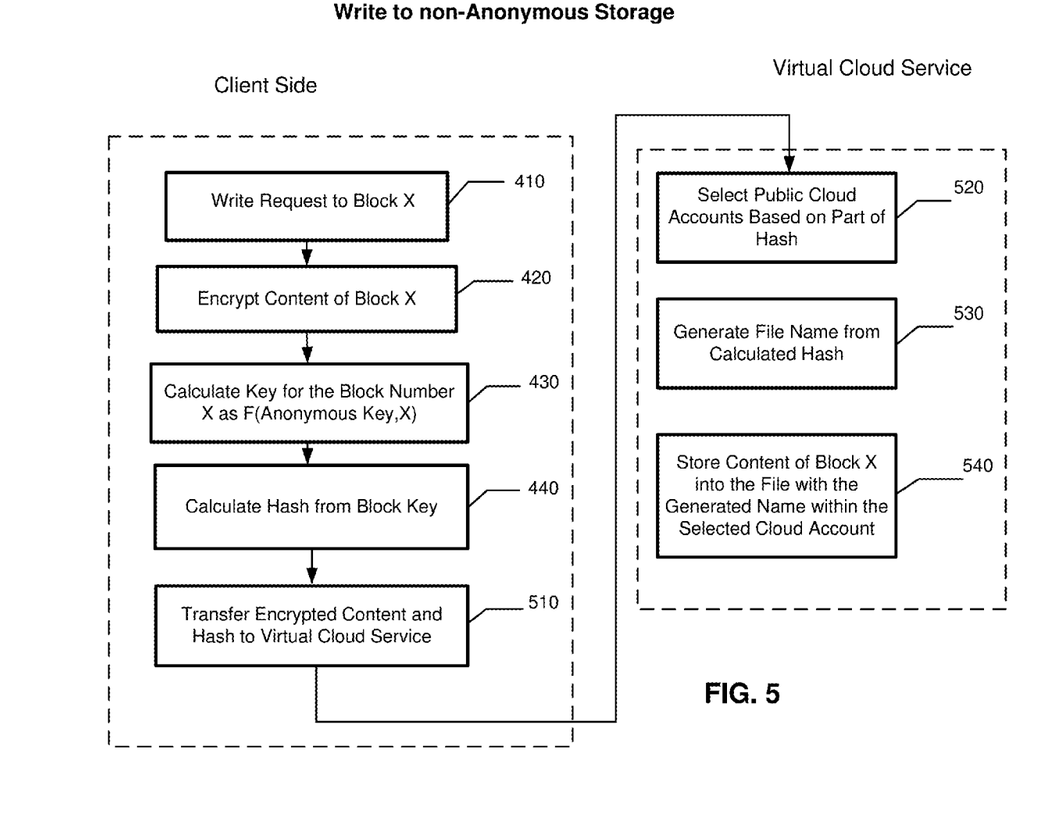
FIG. 5 illustrates a flowchart of a process of writing to a non-anonymous storage, in accordance with the exemplary embodiment.

FIG. 5 illustrates a flowchart of a process of writing to a non-anonymous storage, in accordance with the exemplary embodiment. On a client side, in step 410, a write request to block X is received. Content of the block X is encrypted in step 420. A block key for the block numbers X is calculated as a function, which uses an Anonymous Key and X as its arguments in step 430. In step 440, a hash function value of the block key is calculated. In step 510, the encrypted block content and the hash value are transferred to a Virtual Cloud Service.

Then, on the Virtual Cloud Service, in step 520, public cloud accounts are selected based on part of the hash value. In step 530, a file name is generated from the calculated hash value. In step 540, the content of block X is stored into the file with the generated name within the selected cloud account.

Figure 6:
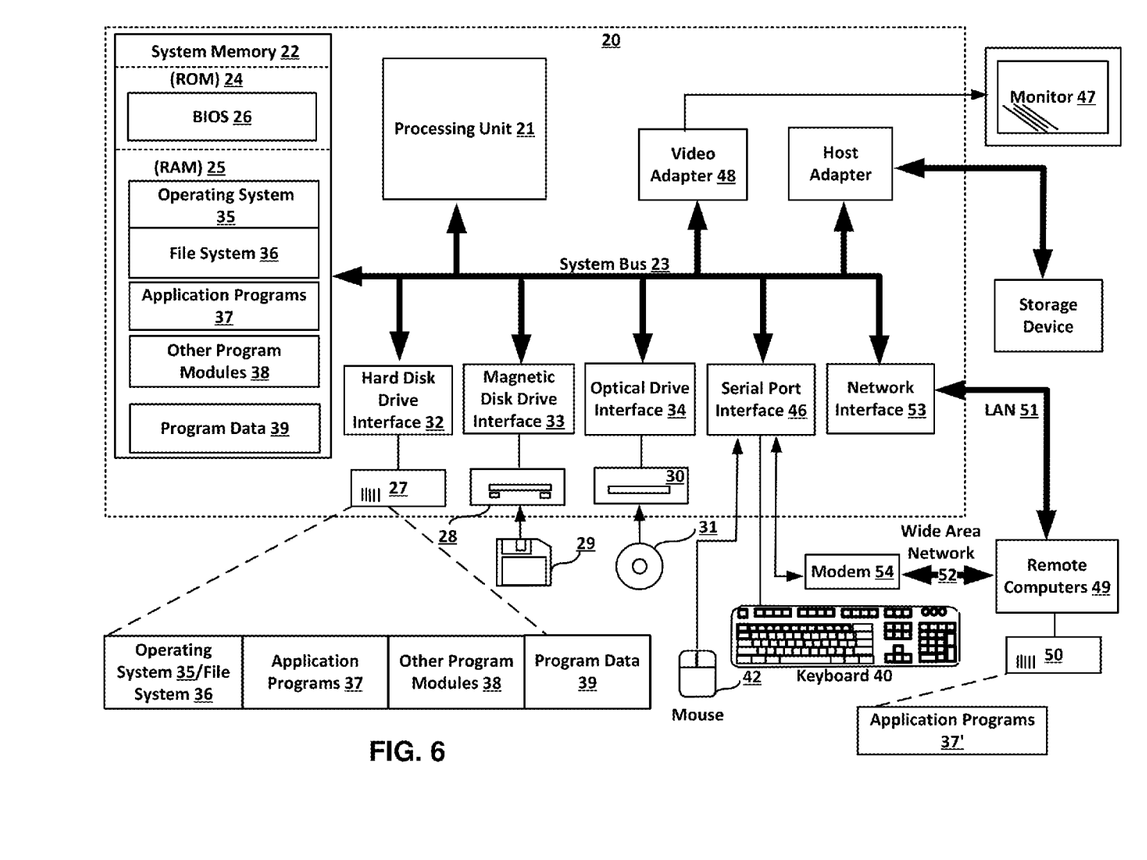
FIG. 6 illustrates a schematic of an exemplary computer or server that can be used for implementation of the invention.

With reference to FIG. 6, an exemplary system for implementing the invention includes a general purpose computing device in the form of a server 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the server 104, such as during start-up, is stored in ROM 24.

The server 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated server-readable media provide non-volatile storage of server readable instructions, data structures, program modules and other data for the server 20.

Although the exemplary environment described herein employs a hard disk, a removable magnetic disk 29 and a removable optical disk 31, it should be appreciated by those skilled in the art that other types of server readable media that can store data that is accessible by a server, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The server 20 includes a file system 36 associated with or included within the operating system 35, one or more application programs 37, other program modules 38 and program data 39. A user may enter commands and information into the server 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal servers typically include other peripheral output devices (not shown), such as speakers and printers.

The server 20 may operate in a networked environment using logical connections to one or more remote servers 49. The remote server (or servers) 49 may be another server, a server, a router, a network PC, a peer device or other common network node, and typically includes many or all of the elements described above relative to the server 20, although only a memory storage device 50 has been illustrated. The logical connections include a local area network (LAN) 51 and a wide area network (WAN) 52. Such networking environments are commonplace in offices, enterprise-wide server networks, Intranets and the Internet.

When used in a LAN networking environment, the server 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the server 20, or portions thereof, may be stored in the remote memory storage device. It will be appreciated that the network connections shown are exemplary and other means of establishing a communications link between the servers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for writing into an anonymous storage, the method comprising:
   receiving, at a client device, a request to write user data to block X, wherein X is a block number in virtual storage;
   generating an anonymous block key for block X using a function operating on an anonymous key associated with the client device and X as its arguments;
   calculating a function value based on the anonymous block key;
   generating a file name as a textual representation of the function value; and
   storing, on a storage hosted at a server, the user data associated with block X in a file with the generated file name, wherein the user data does not indicate user ownership of block X.

2. The method of claim 1, further comprising encrypting the data block X.

3. The method of claim 1, further comprising calculating the function value of the block key as a hash function value of the block key.

4. The method of claim 1, further comprising calculating the anonymous block key as a sum of the anonymous key and a block number (X).

5. A method for writing into a non-anonymous storage:
instantiating a service as an intermediary between a client and a storage;
receiving, at the service, a data block and a function value of a block key, wherein the data block and the function value are received from the client and wherein X is a block number in virtual storage;
selecting an account based on a part of the function value, wherein a size of the part is proportional to a number of users using the service;
generating a file name as a textual representation of the function value; and
storing content of the data block into a file with the generated file name within the selected account on a storage hosted on a server,
wherein a number of bits from the function value used to determine the account is proportional to the number of user accounts and wherein the user data does not indicate user ownership of block X.

6. The method of claim 5, further comprising encrypting the data block.

7. The method of claim 5, further comprising calculating the function value of the block key as a hash function value of the block key.

8. The method of claim 5, wherein the file name for the data block equals to a text representation of the function value.

9. The method of claim 5, wherein the Service writes to the data block into the file within in the selected account on the storage using registered user credentials for accessing the account.

10. The method of claim 5, wherein the storage is a public cloud storage, and accounts are public cloud accounts.

11. A system for writing into an anonymous storage, the system comprising:
a processor, and a memory coupled to the processor, the memory storing computer code for executing on the processor for performing the following steps:
receiving, at a client device, a request to write user data to block X, wherein X is a block number in virtual storage;
generating an anonymous block key for block X using a function operating on an anonymous key associated with the client device and X as its arguments;
calculating a function value based on the anonymous block key;
generating a file name as a textual representation of the function value; and
storing, on a storage hosted at a server, the user data associated with block X in a file with the generated file name, wherein the user data does not indicate user ownership of block X.

12. The system of claim 11, further comprising encrypting the data block.

13. The system of claim 11, further comprising calculating the function value of the block key as a hash function value of the block key.

* * * * *